United States Patent
Xiong et al.

(10) Patent No.: US 10,792,786 B2
(45) Date of Patent: Oct. 6, 2020

(54) LAPPING CARRIER SYSTEM WITH OPTIMIZED CARRIER INSERT

(71) Applicant: Seagate Technology LLC, Cupertino, CA (US)

(72) Inventors: Yuhong Xiong, Maple Grove, MN (US); Andrew David Habermas, Bloomington, MN (US); Kok Yen Goh, Penang (MY); PengKoon Hew, Penang (MY)

(73) Assignee: Seagate Technology LLC, Fremont, CA (US)

( * ) Notice: Subject to any disclaimer, the term of this patent is extended or adjusted under 35 U.S.C. 154(b) by 211 days.

(21) Appl. No.: 15/894,081

(22) Filed: Feb. 12, 2018

(65) Prior Publication Data

US 2019/0247976 A1    Aug. 15, 2019

(51) Int. Cl.
  *B24B 37/30*   (2012.01)
  *B24B 37/04*   (2012.01)
  *B24B 37/005*  (2012.01)
  *G11B 5/31*    (2006.01)

(52) U.S. Cl.
  CPC ............ *B24B 37/30* (2013.01); *B24B 37/005* (2013.01); *B24B 37/048* (2013.01); *G11B 5/3169* (2013.01); *G11B 5/3173* (2013.01)

(58) Field of Classification Search
  CPC ....... B24B 37/30; B24B 37/005; B24B 37/04; B24B 37/048; B24B 49/10
  USPC ......... 451/5, 8, 9, 10, 28; 29/603.15–603.17
  See application file for complete search history.

(56) References Cited

U.S. PATENT DOCUMENTS

| | | | |
|---|---|---|---|
| 5,117,589 A * | 6/1992 | Bischoff | G11B 5/3163 269/234 |
| 5,525,091 A | 6/1996 | Lam et al. | |
| 5,607,340 A * | 3/1997 | Lackey | B24B 37/048 29/603.16 |
| 5,620,356 A | 4/1997 | Lackey et al. | |
| 6,093,083 A | 7/2000 | Lackey | |
| 6,315,636 B1 | 11/2001 | Yanagida et al. | |
| 6,447,367 B1 * | 9/2002 | Kozu | B23Q 1/34 29/603.16 |
| 6,623,336 B2 | 9/2003 | Shindou et al. | |
| 6,939,204 B2 | 9/2005 | Moriya | |
| 6,991,513 B2 | 1/2006 | Tohta et al. | |

(Continued)

FOREIGN PATENT DOCUMENTS

| CN | 1312147 A | 9/2001 |
|---|---|---|
| CN | 1436112 A | 8/2003 |

(Continued)

*Primary Examiner* — Dung Van Nguyen
(74) *Attorney, Agent, or Firm* — Hall Estill Attorneys at Law

(57) ABSTRACT

Embodiments of the present disclosure demonstrate a lapping carrier system for a bar to be lapped. The lapping carrier system may be configured with a single piece insert whose bridge is separated from a plurality of joints of the carrier insert by a varying distance. The varying distance can be greater at a medial portion of the bridge than at an end portion of the bridge to collectively form a parabolic shape. In some embodiments, a lapping insert can include a bridge with its length longer than the bar. In some embodiments in a lapping insert, the centerline between the end joint edge and the end finger edge extends beyond the edge of bar.

20 Claims, 6 Drawing Sheets

(56) References Cited

U.S. PATENT DOCUMENTS

| | | |
|---|---|---|
| 7,086,931 B2 | 8/2006 | Oyama et al. |
| 7,153,198 B2 | 12/2006 | Fujii et al. |
| 8,066,547 B1 | 11/2011 | Schuh et al. |
| 8,137,157 B2 | 3/2012 | Fletcher et al. |
| 9,017,139 B2 | 4/2015 | Ronshaugen et al. |
| 2002/0015139 A1 | 2/2002 | Hara |
| 2004/0209546 A1 | 10/2004 | Nishioka et al. |
| 2006/0160473 A1 | 7/2006 | Fujii et al. |
| 2008/0242203 A1 | 10/2008 | Abe et al. |
| 2015/0258655 A1 | 9/2015 | Koon et al. |

FOREIGN PATENT DOCUMENTS

| | | |
|---|---|---|
| CN | 1762658 A | 4/2006 |
| JP | 2004-142040 A | 5/2004 |
| JP | 2008-310927 A | 12/2008 |

\* cited by examiner

LAPPING CARRIER SYSTEM WITH OPTIMIZED CARRIER INSERT

SUMMARY

Various embodiments of this disclosure generally relate to a lapping carrier system for bar lapping. A lapping carrier system can be composed of a lapping carrier insert and a lapping carrier frame supporting the insert during lapping. In assorted and non-limiting embodiments, a bridge of a carrier insert is positioned on one edge of the carrier insert and contacts a bar. The bridge is separated from a first joint of the carrier insert by a first distance and separated from a second joint of the carrier insert by a second distance with the first distance being greater than the second distance.

A lapping carrier system, in some embodiments, has a bridge separated from a plurality of joints of the carrier insert by a varying distance that is greater at a medial portion of the bridge than at an end portion of the bridge to collectively form a parabolic shape.

In some embodiments, a lapping carrier can include a bridge with its length longer than the bar. In some embodiments, the bridge end edge aligns with the centerline between the end joint edge and the end finger edge for better bar end control. The lapping carrier system may be configured with a single piece insert for better carrier durability.

DETAILED DESCRIPTION

Various embodiments of this disclosure generally relate to a lapping carrier system for constructing components of a data storage device, such as a hard disk drive with at least one rotating magnetic medium.

With demand for increased data storage device data capacity and data access performance, the structural precision of components of the data storage device is emphasized. Existing tools for the manufacturing of data storage device components lack the precision to maximize the potential of component design. As a result, fabrication scrap is relatively high. Accordingly, the lapping carrier system of the present disclosure optimize data storage device component manufacturing by reducing fabrication variations and scrap, which heighten the data access performance of the components utilized in a data storage device.

Figure 1:
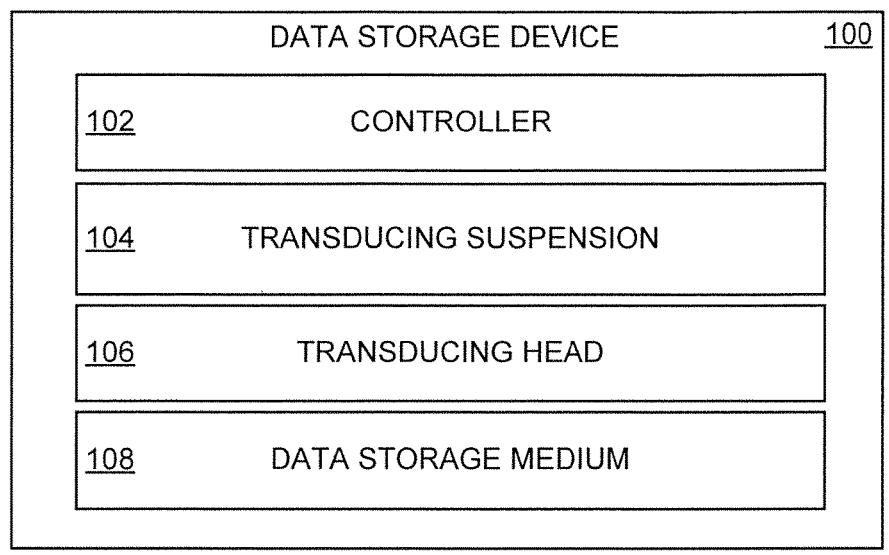
FIG. 1 is a block representation of an example data storage device in which assorted embodiments can be practiced.

FIG. 1 depicts a block representation of an example data storage device 100 in which assorted embodiments can be practiced. The data storage device 100 can have top-level control dictated by at least one local controller 102, such as a microprocessor or programmable processor. The controller 102 may carry out data access operations, such as data writes, data reads, and data maintenance, on at least one magnetic data storage medium 108 with a transducing head 106 equipped under a transducing suspension 104. It is contemplated that the controller 102, data storage medium 108, and transducing head 106 are collectively positioned within a common housing with wired, or wireless, interconnections with other data storage devices or networking components, such as a server, node, or remote host.

Figure 2A:
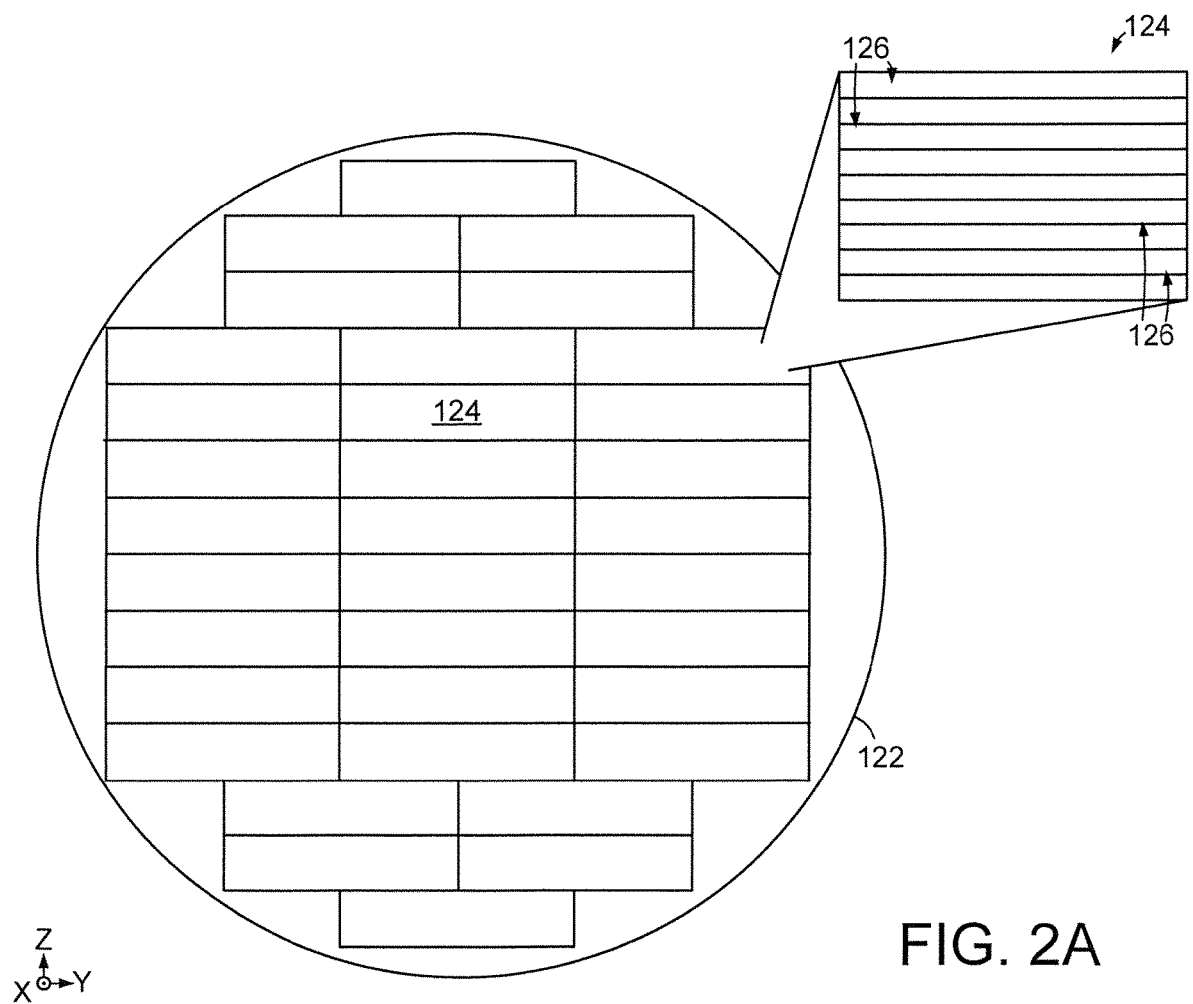
FIGS. 2A, 2B, and 2C respectively show a wafer structure and portions of an example lapping carrier system arranged in accordance with some embodiments.
Figure 2B:
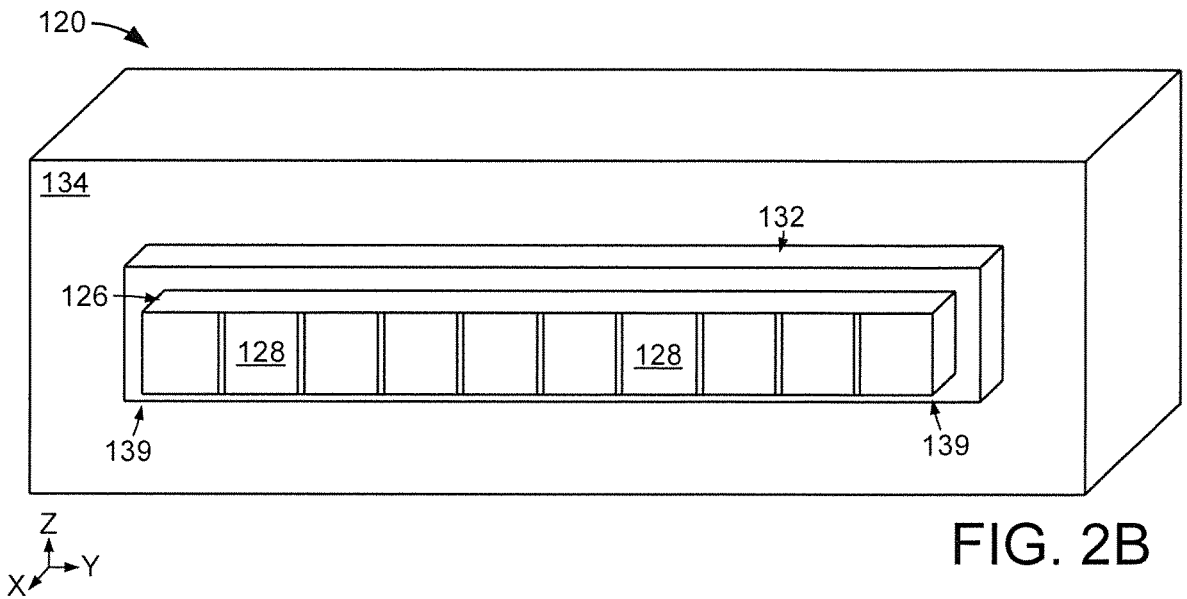
Figure 2C:
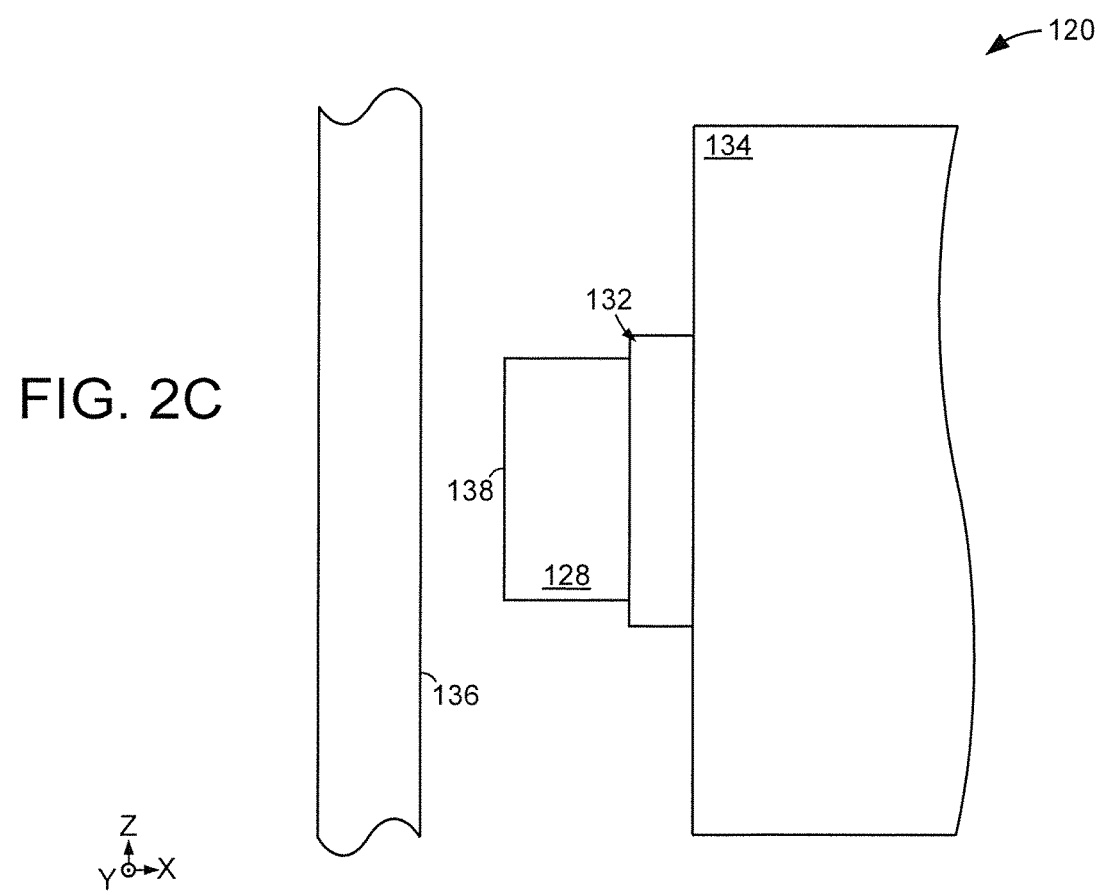

FIGS. 2A, 2B, and 2C respectively demonstrate a wafer structure and convey line representations of portions of an example lapping carrier system 120 constructed in accordance with some embodiments. In FIG. 2A, a top view of an exemplary wafer 122 is shown. The wafer 122 is manufactured into a plurality of chunks 124 that each comprises a plurality of bars 126. Each bar contains a number of transducing heads that collectively undergo a lapping operation to form an air bearing surface (ABS) prior to being physically separated into independent transducing heads that can be used in the data storage device 100.

Each transducing head has at least one data writer (W) and at least one magnetoresistive data reader (R) and can be characterized as a slider. Bars are processed by slicing the wafer 122 into separate rows, slicing the rows into separate chunks, and then slicing the chunks into separate bars. Bars can be processed using a lapping carrier system, which can be composed of a lapping carrier insert and a lapping carrier frame supporting the insert during lapping. FIG. 2B shows how a bar 126 can be mounted to a lapping bridge 132 of a carrier insert 134 as a portion of a lapping carrier system 120. The presentation of the bar 126 on the bridge 132 allows for efficient engagement of the respective heads 128 with one or more abrasive surfaces 136, as illustrated in FIG. 2C, to produce a substantially smooth and planar head surface 138. Such physical processing against an abrasive surface 136 can be characterized as lapping so that target reader and writer heights can be exposed. It is contemplated that the head surface 138 contacting the abrasive surface 136 is an ABS of each head 128 that is configured to face a recording media of a corresponding data storage device.

Reader and writer heights in each head 128 will vary across each bar 126 due to wafer processing variations. Thus, processing of individual heads 128 is ideal. However, the utilization of physically connected heads 128 as part of a bar 126 can allow for more efficient processing than if individual heads 128 were processed. The problem of processing at the bar level is that the accuracy and precision of physical processing can be inconsistent throughout the bar 126. That is, different heads 128 of a single bar 126 can receive different physical processing that results in variances in the head-to-head surfaces 138, which can produce unwanted deviation from design specifications. Such variances can be particularly acute at the ends 139 of the bar 126. It is noted that an issue with some lapping carrier 134 configurations is that the actuation force available at very end of carrier 134 is weak and results in the last 2-3 heads 128 from each end per bar 126 not having sufficient available force to achieve intended reader dimensions.

Figure 3A:
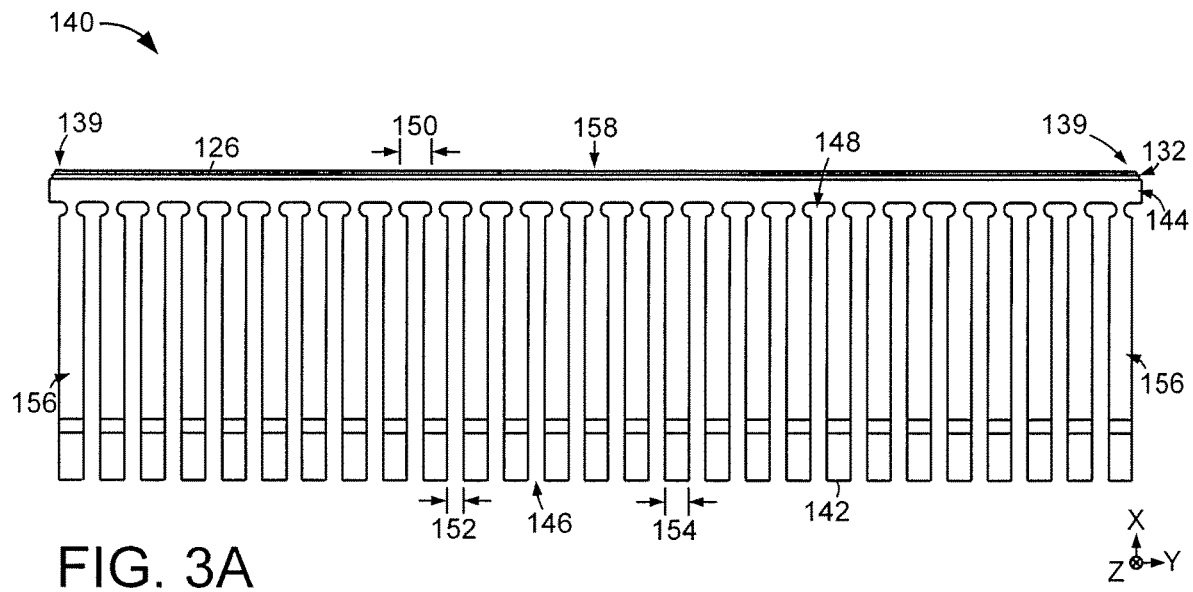
FIGS. 3A and 3B respectively depict portions of an example lapping carrier insert configured in accordance with various embodiments.
Figure 3B:
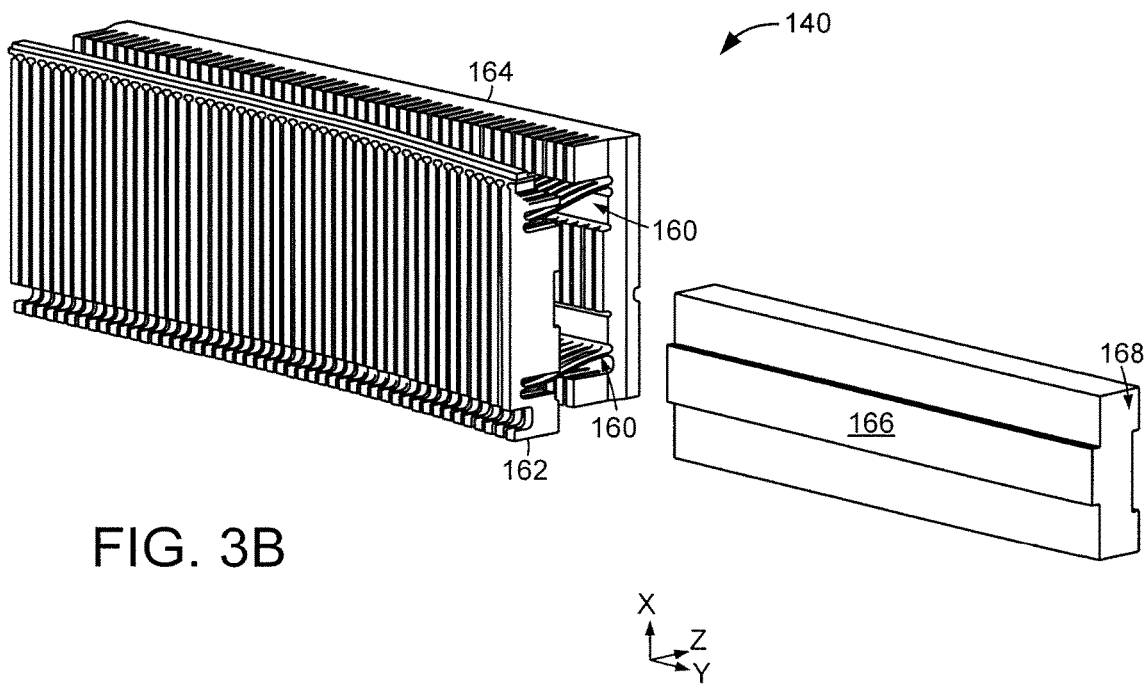

FIGS. 3A and 3B respectively display line representations of portions of an example lapping carrier insert 140 that can be utilized in the lapping carrier system of FIG. 2B. The top view of FIG. 3A illustrates how the carrier insert 140 is configured with a plurality of individual fingers 142 that continuously extend from a bridge body 144. The respective fingers 142 are separated by a continuous slot 146 that allows for individual finger articulation.

Each slot 146 terminates proximal the bridge body 144 with a joint 148 that has a joint width 150. The joint width 150 is configured to be greater than the continuous uniform finger-to-finger spacing 152 extending from the respective joints 148 between the respective fingers 142. The joints 148 and joint widths 150 can be configured to allow a predetermined amount of bridge 132 and bridge body 144 deflection, along the X axis, proximal the attached bar 126 in response to bar contact with an abrasive surface 136. It is noted that the slot width 150 and finger-to-finger spacing 152 define a reduced finger width 154 between adjacent slot joints 148. Such reduced finger width 154 proximal the bridge body 144 allows for lateral finger movement along the X axis.

The lateral finger movement can act in concert with the slots 146 and joints 148 to efficiently and accurately translate force parallel to the X axis into increased, or decreased pressure on the transducing head 128 aligned with the selected finger 142. In other words, the fingers 142, slots 146, and joints 148 are configured to allow precise pressure articulation of one or more transducing heads 128 onto an abrasive surface 136 in an effort to form a substantially planar and smooth ABS surface 138. By configuring the bridge 132 with a length that is less than the bar 126, the bar 126 overhangs the bridge 132 and the heads 128 at the bar ends 139 are not supported by bridge 132, which makes receiving actuation force from edge fingers 156 difficult.

Despite the tuned configuration of the fingers 142, slots 146, and joints 148, head 128 control can be difficult and inaccurate proximal the respective ends 139 of the bar 126. As a result, the scrap rate of the heads 128 located proximal the bar ends 139 can be relatively high compared to heads 128 positioned proximal the medial region 158 of the bar 126. The imprecision of the carrier insert 140 at the respective ends 139 can be attributed to the bar 126 overhanging the bridge 132 and to weak actuation of the end-most fingers 156. Hence, various embodiments configure at least the end-most fingers 156 so that the center-of-mass of the fingers 156 are closer to the bar end 139, such as which increases actuation force on the heads 128 positioned towards the end of bar 126.

As shown in FIG. 3B, the carrier insert 140, formed as a single piece of material, may comprise pairs of flexile beams 160 that physically connect a bar portion 162 with a body portion 164. While not required, a stopper insert 166 can be incorporated between the portions 162/164 and beams 160 to increase stability and control of the bar 126 in response to contact with an abrasive surface 136. It is noted that the stopper insert 166 can be a single-piece of rigid material that is keyed into the respective portions 162/164 via cantilevered protrusions 168, as shown in the exploded view of FIG. 3B. Although the addition of the beams 160, body portion 164, and stopper insert 166 can increase control of the bar 126 during physical processing, it is noted that the precision and accuracy is not practically improved for the heads 128 proximal the bar ends 139.

Figure 4A:
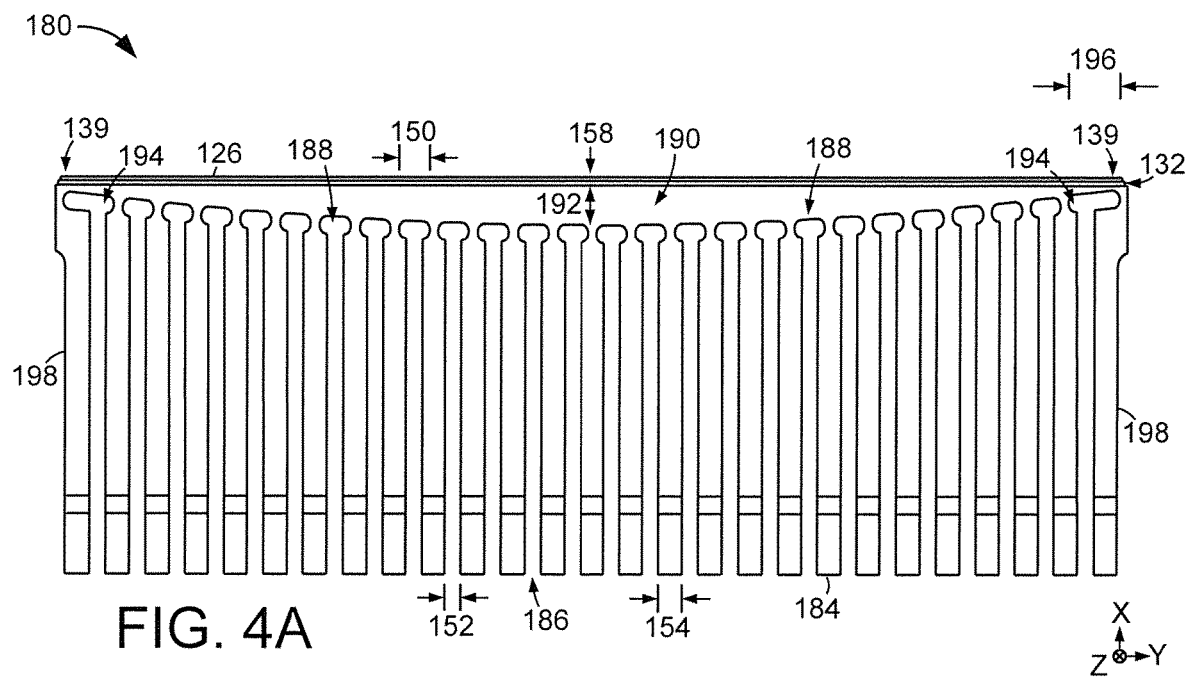
FIGS. 4A and 4B respectively illustrate portions of an example for an optimized lapping carrier insert constructed in accordance with assorted embodiments.
Figure 4B:
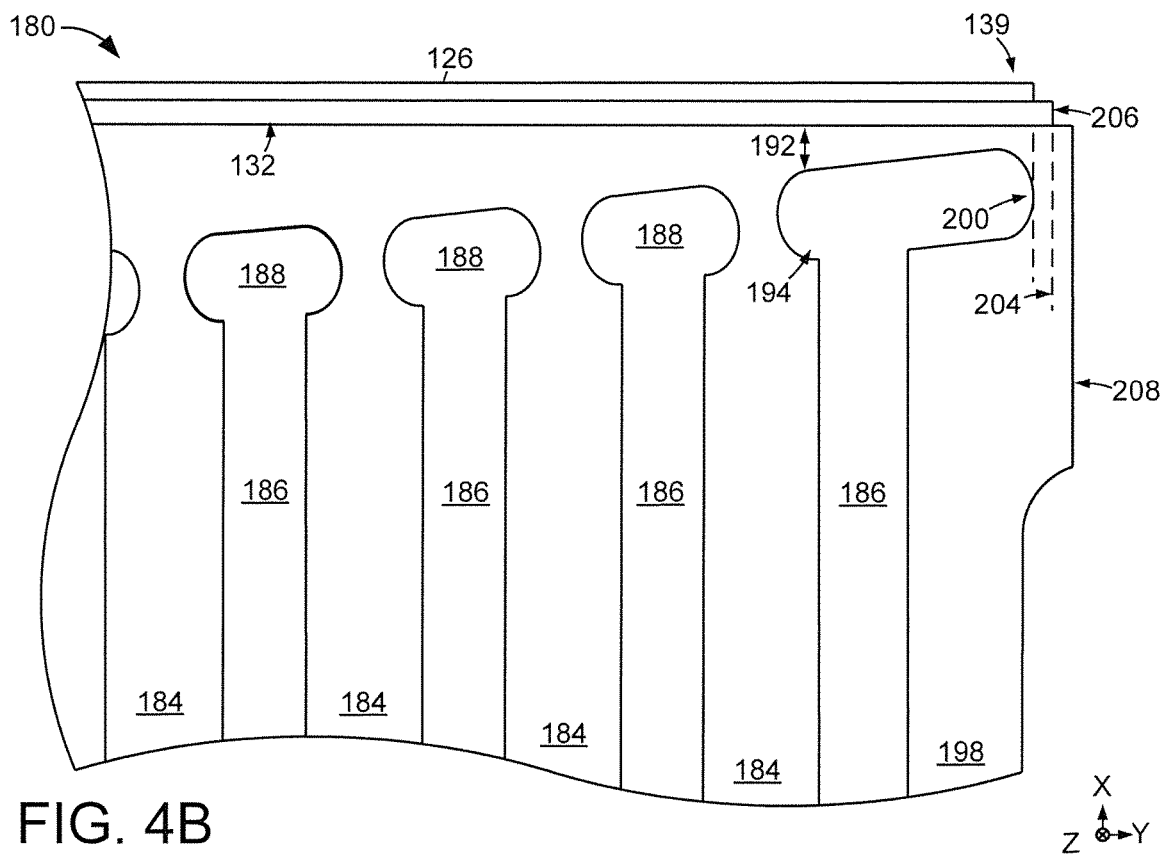

Hence, various embodiments are directed to carrier configurations that increase the accuracy, control, and precision of lapping operations on transducing heads 128 positioned at, and proximal to, the bar ends 136. FIGS. 4A and 4B respectively illustrate line representations of portions of an optimized lapping carrier insert 180 constructed and operated in accordance with various embodiments. FIG. 4A is a top view of an exemplary carrier insert 180 in which a plurality of indexable fingers 184 are defined by separate slots 186. Each slot 186 continuously extends through the carrier insert 180 and terminates at a joint 188 proximal the bridge 132 and a bridge body 190 portion of the carrier insert 180.

In contrast to the joints 148 of carrier insert 140 that are each positioned a uniform distance along the X axis from the bridge 132 shown in FIG. 3A, the joints 188 of carrier insert 180 have a varying distance to the bridge 132 relative to the distance from the medial region 158 of the bar 126. As shown, the joints 188, and slots 186, located proximal the medial region 158 of the bar 126, as measured parallel to the X axis, have a greater separation distance 192 from the bridge 132 than the joints 188 located proximal the bar ends 139.

The decreased joint-to-bridge separation distance 192 at the bar ends 139 can be complemented by the customized configuration of the end joints 194 with a greater joint width 196 than the widths 150 of the non-end joints 188. As such, the collective joints 188/194 are arranged in a parabolic shape. The increased end joint width 196 defines an end finger 198 that has a different shape than the interior fingers 184 to allow for greater bar end 139 lapping accuracy and control.

FIG. 4B displays how an end joint 194 can be positioned relative to the bridge end 206 and how the end finger 198 has a different shape than the interior fingers 184. It is noted that the configuration of the end joint 194 reduces the separation distance 192 proximal the bar end 139 and, consequently, increases the actuation deflection at the bar end 139 under a similar actuation force compared to the medial portion 158 of the bar 126.

The end joint 194 and end finger 198 can operate in concert with the extended bridge 132 that is longer than the bar 126 and end joint lateral edge 200. In other words, the centerline 204 between the joint edge 200 and the finger edge 208 extends beyond the edge of bar so that bending force can be transferred from the end finger 198 to the end edge 206 of the bridge 132 to fully control the bar end 139.

Figure 5A:
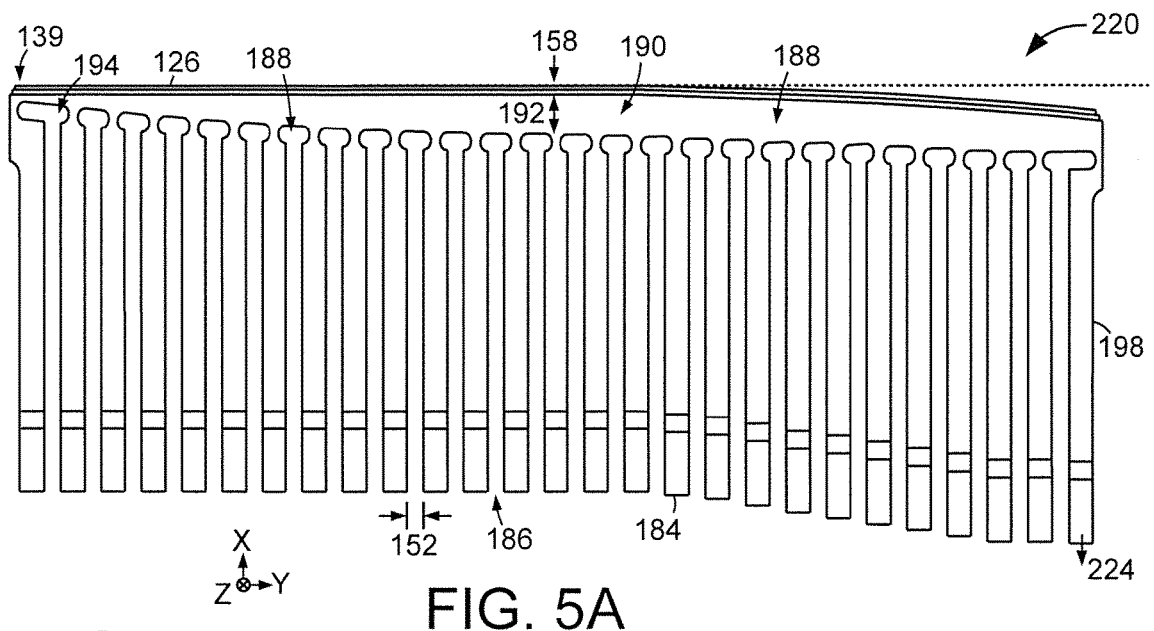
FIGS. 5A and 5B respectively show increased displacement of the optimized lapping carrier insert arranged in accordance with some embodiments under a bending force.
Figure 5B:
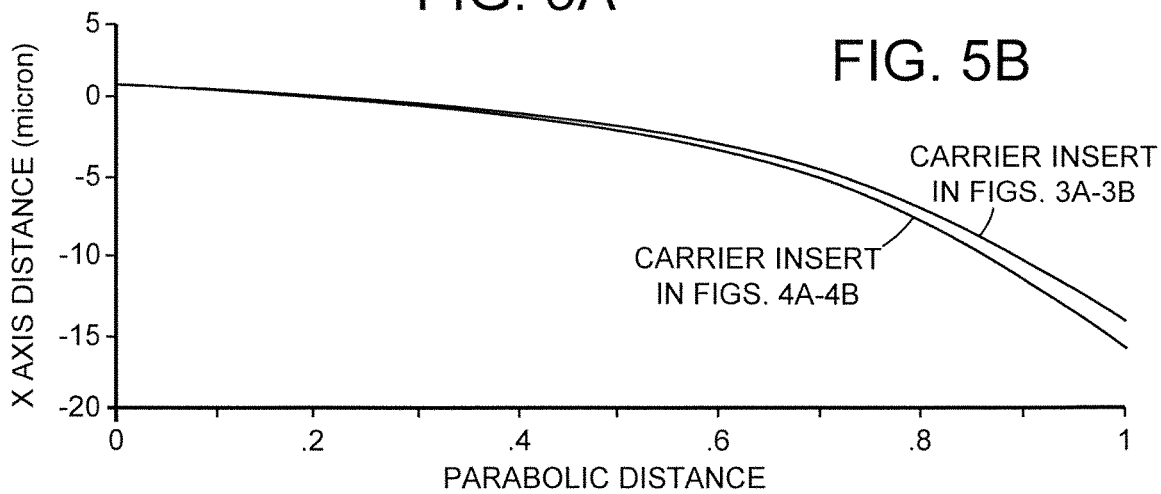

FIGS. 5A and 5B respectively convey aspects of an example lapping carrier insert 220 operated in accordance with some embodiments. The top view of the lapping carrier insert 220 in FIG. 5A shows the bar 126 being displaced during a lapping operation with an abrasive surface 136. The parabolic joint configuration of the carrier insert 220 reacts to force 224 placed at the opposite of the end finger 198, as shown, to provide increased flexibility.

FIG. 5B plots the modeled displacement of the carrier insert 220 along the X axis from FIG. 5A as a function of distance along the Y axis as a result of force 224 from the end finger 198. It is noted that with the incorporation of the parabolic joint 188/194 configuration, along with the longer bridge 132 and end finger 198 arrangement, a 24% increase in carrier flexibility can be enjoyed over the carrier insert 140 of FIGS. 3A-3B.

Figure 6:
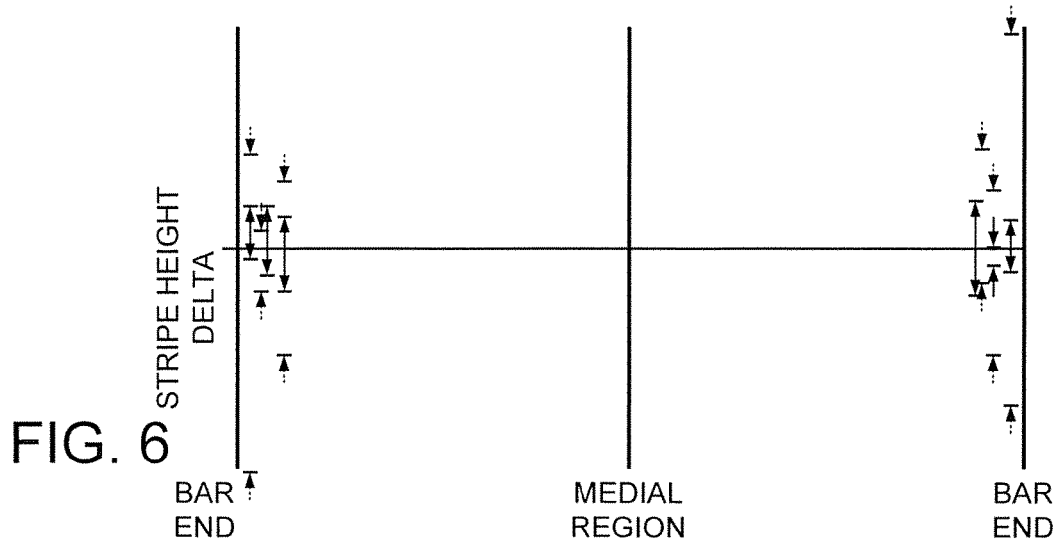
FIG. 6 compares lapping performance difference using carriers equipped with different lapping carrier insert systems that may be operated in accordance with some embodiments.

FIG. 6 graphs operational data associated with the carrier insert 140 of FIGS. 3A-3B and the optimized carrier insert 180 of FIGS. 4A and 4B. The solid ranges represent the carrier insert 180 while segmented ranges represent carrier insert 140. It can be appreciated that the configuration of carrier insert 180 provides a smaller deviation in stripe height delta for transducing heads located proximal the bar ends than carrier insert 140. As such, the stripe height deviation with carrier insert 180 compared to carrier insert 140 for the three heads closest to the bar ends can be lower by 27% or more.

Figure 7:
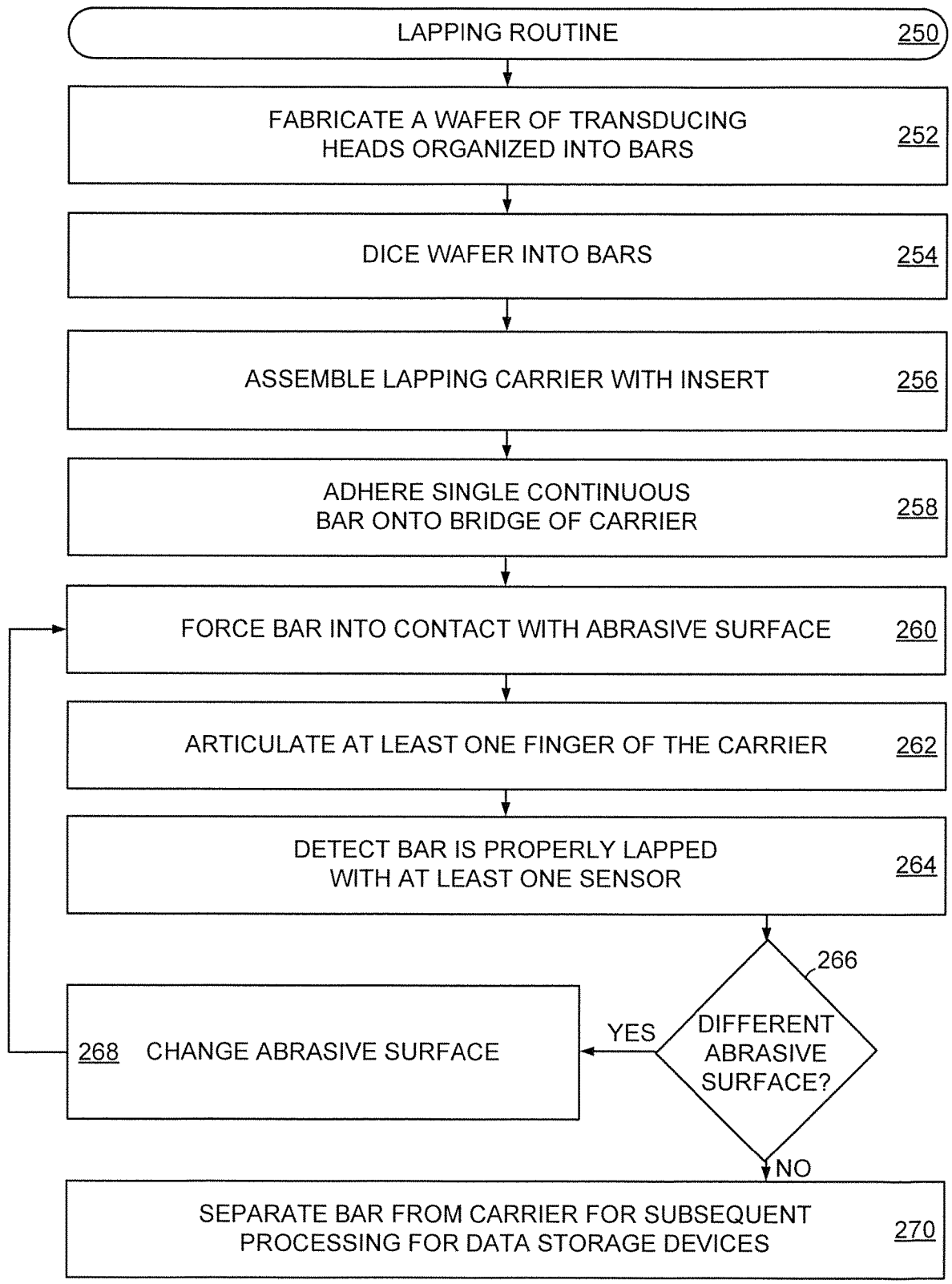
FIG. 7 provides a flowchart of a slider lapping routine conducted in accordance with some embodiments.

FIG. 7 is a flowchart of an example lapping routine 250 that can be conducted with the assorted embodiments of FIGS. 2A-5B. Initially, a wafer is fabricated in step 252 with a plurality of transducing heads aligned in bars, such as the wafer shown in FIG. 2A. Step 254 dices the wafer into bars. At this point, the bars, and the constituent transducing heads on bars, are ready for lapping operations.

Step 256 assembles a lapping carrier by placing an insert with a bridge on the bar portion into a carrier frame. Next, step 258 adheres the single continuous bar of transducing heads onto the bridge of the bar portion of the carrier, as conveyed in FIG. 2B. It is contemplated that the bar portion of the carrier has at least slot joints arranged in a parabolic shape with respect to distance from the bridge. In some embodiments, the parabolic slot joint shape is complemented by aligning the lateral edge of the outermost joint with the end edge of the bar and/or configuring the bridge to be at least 300 micrometers longer than the bar.

With the bar attached to the bridge, the carrier can manually, or autonomously, be forced upon an abrasive surface in step 260, such as in FIG. 2C. The abrasive surface may be vibrating, spinning, or otherwise moving. The carrier may be stationary or also moving. Step 262 proceeds to emphasize portions of the carrier, such as individual fingers of the carrier, to remove greater amounts of bar material. Once one or more lapping sensors indicate the bar is properly configured in step 264, the routine 250 determines if additional abrasive surfaces are to be used in decision 266.

If a different surface is to be utilized, step 268 changes the abrasive surface, such as to a finer grit, before returning to step 260. In the event no additional abrasive surface is called for, the routine 250 physically separates the bar from the bridge, which allows the individual heads of the bar to be separated and subsequently constructed into data storage devices in step 270. It is noted that routine 250 is not limited to the various steps and decision shown in FIG. 7 as any aspect can be omitted, changed, and added, without restriction.

What is claimed is:

1. An apparatus comprising a bridge of a carrier insert positioned on one edge of the carrier insert and connectable to a bar separated from a first joint of the carrier insert by a first distance at a medial portion of the bridge and separated from a second joint of the carrier insert by a second distance, the second joint positioned closer to an edge of the bridge than the first joint, the first distance being greater than the second distance.

2. The apparatus of claim 1, wherein the first joint is aligned with a medial portion of the bar, the second joint aligned with an end portion of the bar.

3. The apparatus of claim 1, wherein the first joint continuously extends to a slot.

4. The apparatus of claim 3, wherein the first joint has a joint width that is greater than a slot width of the slot.

5. The apparatus of claim 3, wherein the first joint and slot physically separate fingers of the carrier insert.

6. The apparatus of claim 1, wherein the bridge having a length longer than the bar.

7. The apparatus of claim 1, wherein the second joint has a different joint width than the first joint, enabling for the joint edge on edge fingers to move outwards.

8. The apparatus of claim 1, wherein a centerline between an end joint edge and an end finger edge extends beyond an edge of bar.

9. The apparatus of claim 1, wherein the bar comprises a plurality of transducing heads.

10. An apparatus comprising a bridge of a carrier insert positioned on one edge of the carrier insert and connectable to a bar separated from a plurality of joints of the carrier insert by a varying distance, the varying distance being greater at a medial portion of the bridge than at an end portion of the bridge.

11. The apparatus of claim 10, wherein the plurality of joints collectively have a parabolic shape.

12. The apparatus of claim 10, wherein the bridge is separated from the plurality of joints by a bridge body.

13. The apparatus of claim 12, wherein the bridge body is continuously solid.

14. The apparatus of claim 10, wherein the carrier insert is formed as a single piece of material.

15. The apparatus of claim 10, wherein the plurality of joints define a plurality of fingers, each finger of the plurality of fingers being individually articulated to apply force to different portions of the bar.

16. The apparatus of claim 10, wherein the varying distance continuously decreases from the medial portion of the bar to the end portion of the bar.

17. A method comprising:
    attaching a bar to a bridge of a carrier insert, the bridge separated from a plurality of joints of the carrier insert by a varying distance, the varying distance being greater at a medial portion of bar than at an end portion of the bar; and
    lapping the bar against an abrasive surface to form an air bearing surface for at least one transducing head of the bar.

18. The method of claim 17, wherein the bar is formed by slicing a wafer into multiple chunks and subsequently slicing at least one chunk into multiple bars.

19. The method of claim 17, further comprising cutting the bar into multiple separate transducing heads after the lapping step.

20. The method of claim 17, wherein a variable resistance sensor detects target lapping height of the transducing head by measuring resistance during lapping.

* * * * *